United States Patent
Ma et al.

(10) Patent No.: US 12,125,978 B2
(45) Date of Patent: Oct. 22, 2024

(54) BORON-CONTAINING PLASTIC CRYSTAL POLYMER AND PREPARATION METHOD THEREFOR AND APPLICATION THEREOF

(71) Applicant: SHANGHAI ZIJIAN CHEMICAL TECHNOLOGY CO., LTD, Shanghai (CN)

(72) Inventors: Zifeng Ma, Shanghai (CN); Suli Chen, Shanghai (CN); Haiying Che, Shanghai (CN); Fan Feng, Shanghai (CN)

(73) Assignee: SHANGHAI ZIJIAN CHEMICAL TECHNOLOGY CO., LTD, Shanghai (CN)

( * ) Notice: Subject to any disclaimer, the term of this patent is extended or adjusted under 35 U.S.C. 154(b) by 718 days.

(21) Appl. No.: 17/293,478

(22) PCT Filed: Oct. 24, 2019

(86) PCT No.: PCT/CN2019/112993
§ 371 (c)(1),
(2) Date: May 13, 2021

(87) PCT Pub. No.: WO2020/103636
PCT Pub. Date: May 28, 2020

(65) Prior Publication Data
US 2022/0052377 A1 Feb. 17, 2022

(30) Foreign Application Priority Data
Nov. 19, 2018 (CN) ............ 201811376115.5

(51) Int. Cl.
*H01M 10/0565* (2010.01)
*C08F 2/44* (2006.01)
(Continued)

(52) U.S. Cl.
CPC .......... *H01M 10/0565* (2013.01); *C08F 2/44* (2013.01); *C08F 2/48* (2013.01); *C08F 130/06* (2013.01);
(Continued)

(58) Field of Classification Search
None
See application file for complete search history.

(56) References Cited

U.S. PATENT DOCUMENTS

2010/0009266 A1    1/2010   Itoh et al.

FOREIGN PATENT DOCUMENTS

| CN | 101563807 A | 10/2009 |
| CN | 105633468 A | 6/2016 |

(Continued)

OTHER PUBLICATIONS

Machine translation of KR 1020120114716, Oct. 2012.*
(Continued)

*Primary Examiner* — Jonathan Crepeau
(74) *Attorney, Agent, or Firm* — Houston Beshining Law Office PLLC; Liangang Ye (57) ABSTRACT

The present invention discloses a boron-containing plastic crystal polymer and a preparation method therefor and an application thereof. The described preparation method comprises the following step: curing a mixture containing a plastic crystal, a metal salt, a monomer and a photoinitiator. The plastic crystal polymer prepared by the present invention can be used as all-solid electrolyte, without any liquid additive being added therein. The obtained electrolyte has a room-temperature ionic conductivity up to 3.6×10−4 S/cm, and shows a high sodium ion transference number and a wide electrochemical window up to 4.7V. The present invention further prepares composite positive and negative electrodes for positive and negative electrode modification of a
(Continued)

sodium ion battery. A finally assembled all-solid sodium ion battery shows good rate performance and cycle stability at room temperature, achieving a specific discharge capacity up to 104.8 mAh/g at room temperature and a capacity retention ratio of 85.4% after 80 cycles.

14 Claims, 2 Drawing Sheets

(51) Int. Cl.
    *C08F 2/48*     (2006.01)
    *C08F 130/06*     (2006.01)
    *H01M 4/04*     (2006.01)
    *H01M 10/0567*     (2010.01)

(52) U.S. Cl.
    CPC ..... *H01M 4/0416* (2013.01); *H01M 10/0567* (2013.01)

(56) References Cited

FOREIGN PATENT DOCUMENTS

| | | |
|---|---|---|
| CN | 109786820 A | 5/2019 |
| JP | 2010177001 A | 8/2010 |
| JP | 2011090952 A | 5/2011 |
| JP | 2011181463 A | 9/2011 |
| KR | 20120114716 A | 10/2012 |
| RU | 2358358 C1 * | 6/2009 |

OTHER PUBLICATIONS

Jan. 14, 2020 International Search Report issued in International Patent Application No. PCT/CN2019/112993.

Jan. 14, 2020 Written Opinion of the International Searching Authority issued in International Patent Application No. PCT/CN2019/112993.

Jul. 23, 2021 Chinese Office Action issued in Chinese Patent Application No. 201811376115.5.

* cited by examiner

BORON-CONTAINING PLASTIC CRYSTAL POLYMER AND PREPARATION METHOD THEREFOR AND APPLICATION THEREOF

The present application is a National Stage of International Application No. PCT/CN2019/112993, filed on Oct. 24, 2017, which claims priority of the Chinese Patent Application No. 2018113761155 filed on Nov. 19, 2018, the contents of which are incorporated herein by their entireties.

TECHNICAL FIELD

The present disclosure relates to the technical field of batteries, and particularly relates to a boron-containing plastic crystal polymer and a preparation method therefor and a use thereof.

BACKGROUND

Due to the advantages of long cycle life, high energy density, no memory effect, fast charging and discharging speed, and environmental friendliness, lithium batteries have made rapid development in the field of energy storage in the past two decades and have been widely used in various electronic mobile devices, electric vehicles and other fields. However, limited lithium resources and increasing lithium prices will also become important factors restricting the further development of lithium ion batteries. Compared with the scarce lithium element, the abundant sodium element is widely available, low in cost, and has similar chemical and physical properties to the lithium element, which makes sodium batteries and sodium ion batteries become a research hotspot in recent years, and is expected to replace lithium ion batteries in the future in the field of large-scale energy storage (electric vehicles and smart grids, etc.).

Electrolyte is an important part of sodium ion batteries, which plays a pivotal role in determining the electrochemical performance of the batteries and ensuring the safety and reliability of the batteries. Like lithium ion batteries, the electrolytes currently used in sodium ion batteries are traditional organic liquid electrolytes (electrolyte), which are mainly composed of sodium salt and organic solvent. Traditional electrolytes have the disadvantages such as volatile, easy to leak, flammable and explosive, and corrosion of the battery case, which are easy to cause a series of safety accidents in the process of use. In addition, the electrochemical window of the electrolyte is narrow (about 4V), it is difficult to match the high-voltage positive electrode materials, and the electrolyte is incompatible with the lithium metal negative electrode with high theoretical capacity, which limits the improvement of energy density of lithium ion batteries. The use of solid-state electrolyte instead of organic electrolyte and the development of all-solid-state sodium ion batteries may fundamentally solve the potential safety hazards of the batteries and greatly improve the energy density of the sodium ion batteries. Currently reported solid electrolytes for sodium ion batteries mainly include inorganic ceramic electrolytes, solid polymer electrolytes and organic/inorganic composite electrolytes. However, there is no mature all-solid-state electrolyte that may meet the practical requirements in terms of ionic conductivity, electrochemical stability, mechanical properties, electrode compatibility etc. For example, although inorganic ceramic electrolyte has high ionic conductivity, the preparation conditions are harsh and the electrode/electrolyte interface impedance is large; although the solid polymer electrolyte is easy to process and has better contact with electrode than the former, it has poor mechanical properties, low sodium ion migration number and low room temperature ionic conductivity ($<10^{-5}$ S/cm). The above factors have restricted the development of solid-state sodium ion batteries. It should be noted that due to the low room temperature ionic conductivity of polymer solid-state electrolytes, all-solid-state batteries based on polymer electrolytes reported at present mostly work above their melting points. When the temperature is higher than the melting point of polymer matrix, the mechanical properties of electrolyte film will deteriorate and there will be a potential safety hazard of short circuit. Therefore, the biggest challenge for all-solid-state sodium secondary batteries is the high impedance of electrode/electrolyte interface and the low ionic conductivity of electrolyte at room temperature. The development of an electrode/electrolyte interface with high room temperature ionic conductivity, excellent mechanical properties, gentle construction is the key to the development of all-solid sodium secondary batteries. Content of the present disclosure One of the technical solutions of the present disclosure is a method for preparing a boron-containing plastic crystal polymer, which comprises the following steps: curing a mixture containing a plastic crystal, a metal salt, a monomer and a photoinitiator; the monomer is a boron-containing ternary crosslinker (B-crosslinker), the structure of which is shown below:

wherein, the value of n is 1 to 20, such as 1, 6 or 20; the plastic crystal is succinonitrile (SN).

The crosslinker may be prepared by oneself according to the literature, for example, it may be prepared according to the preparation method described in *ACS Appl. Mater. Interfaces* 2016, 8, 27740-27752.

In the method, preferably, the plastic crystal is mixed with the metal salt to obtain a mixed solution and then mixed with the monomer and the photoinitiator to obtain the mixture.

To further improve the electrochemical properties of the prepared electrolyte, especially the ionic conductivity, a concentration of the metal salt in the mixed solution is preferably 0.25 to 1.25 mol/L, more preferably 1 mol/L. In the mixture, a concentration of the B-crosslinker is preferably 8 to 30 wt. %, more preferably 10 wt. %. An amount of the photoinitiator is preferably 0.5 to 5 wt. %, more preferably 1 wt. % of the B-crosslinker. The mixture may be prepared by conventional methods in the art, and in a preferred embodiment of the present disclosure, the method comprises the following steps:

(1) mixing the metal salt with the plastic crystal, heating and stirring to obtain a mixed solution;

(2) mixing a metal salt solution of the plastic crystal obtained in step (1) with the B-crosslinker and the photoinitiator to obtain the mixture.

The metal salt described in the present disclosure may be a metal salt conventionally used in the art for the preparing ion batteries, such as sodium salt, lithium salt or aluminum salt, etc. When the metal salt is a sodium salt, the sodium salt may be a conventional sodium salt in the art, preferably one or more of sodium perchlorate, sodium hexafluorophosphate, sodium bis(oxalate)borate, sodium trifluoromethanesulfonate.

The photoinitiator may be a conventional photoinitiator in the art, such as 1173 (2-hydroxy-2-methyl-1-phenylacetone), 184 (1-hydroxycyclohexyl phenyl ketone), etc.

The curing may be carried out by conventional methods in the art to ensure the high efficiency, cleanness, environmental protection and economy of curing, the curing is preferably ultraviolet curing. The ultraviolet curing described in the present disclosure is a conventional ultraviolet curing in the art, i.e., the process of irradiating the liquid "UV irradiated hardenable material" with ultraviolet (UV) rays to harden it is also called "UV Curing Process". The application range of industrial UV wavelength is 200 to 400 nm.

In order to improve the self-support of the boron-containing plastic crystal polymer and the mechanical strength of the final electrolyte, the mixture is preferably added to a porous support material before the curing, and the addition is preferably injection. The porous support material may be purchased commercially or prepared by oneself, and has good compatibility with the plastic crystal metal salt solution. The porous support material may be one or a composite film of polyacrylonitrile nonwoven fabric, polypropylene hydrocarbon nonwoven fabric, cellulose film, glass fiber, polyethylene terephthalate film and polyimide nonwoven film, preferably polyacrylonitrile nonwoven fabric, polypropylene-cellulose composite nonwoven fabric (a composite film of polypropylene hydrocarbon nonwoven fabric and cellulose, the composite is a chemical composite) or cellulose film in the present disclosure.

The mixture described in the present disclosure is preferably present in liquid form.

The mixture described in the present disclosure is preferably formed from the plastic crystal, the metal salt, the monomer and the photoinitiator.

If the boron-containing plastic crystal polymer in the form of a film is to be prepared, a porous support material containing the above mixture may be sandwiched between two glass sheets before subsequent curing.

The second technical solution of the present disclosure is a boron-containing plastic crystal polymer prepared by the above-mentioned method.

The third technical solution of the present disclosure is a use of the above-mentioned boron-containing plastic crystal polymer as solid-state electrolyte in an all-solid-state ion battery.

The fourth technical solution of the present disclosure is an all-solid-state ion battery containing the above-mentioned boron-containing plastic crystal polymer.

The fifth technical solution of the present disclosure is a method for preparing an all-solid-state ion battery, which comprises the following steps:

(1) immersing an electrode sheet in the above-mentioned mixture until the mixed solution is fully immersed into the inside of the electrode sheet (usually 10 to 30 minutes), curing to obtain a composite positive and negative electrode sheet prepared in situ;

(2) sandwiching the boron-containing plastic crystal polymer between the composite positive and the negative electrode sheet, and assembling.

The electrode sheet may be a conventional electrode sheet in the art, such as a commercially available conventional electrode sheet or a self-prepared electrode sheet, which may be prepared by the following conventional steps:

(1) adding a positive/negative electrode active material for ion batteries, a conductive agent and a binder to N-methylpyrrolidone solvent and homogenizing to obtain a slurry;

(2) evenly coating the slurry on aluminum foil, and drying in vacuum.

A ratio range of the positive/negative electrode active material for the ion batteries, the conductive agent and the binder is a conventional range of batteries, i.e., a mass ratio of the positive/negative electrode active material for the ion batteries to the conductive agent is (3 to 16):1, a mass ratio of the binder to the conductive agent is (0.25 to 4):1, and the homogenization time is 2 to 4 hours; preferably, the mass ratio of the positive/negative electrode active material for the ion batteries to the conductive agent is 8:1, and the mass ratio of the binder to the conductive agent is 1:1; the homogenization time is also 2 to 4 hours conventional in the art.

The positive electrode active material may be a conventional positive electrode active material in the art, preferably layered oxide, sodium vanadium phosphate, sodium iron sulfate, sodium ion fluorophosphate, Prussian blue, Prussian white, sodium vanadium fluorophosphate, sodium iron fluorophosphate, sodium manganese oxide or sodium cobalt oxide.

The negative electrode active material may be a conventional negative electrode active material in the art, preferably sodium metal, hard carbon or molybdenum disulfide.

The above conductive agent may be conventional in the art, preferably Super P, acetylene black or Ketjen black.

The above binder may be conventional in the art, preferably one or more of PVDF, sodium carboxymethyl cellulose and sodium alginate.

Based on common knowledge in the art, each of the above preferred conditions may be combined arbitrarily to obtain each preferred embodiment of the present disclosure.

The reagents and raw materials used in the present disclosure are commercially available.

The positive and progressive effects of the present disclosure are that:

The plastic crystal polymer prepared by the present disclosure may be used as an all-solid-state electrolyte without any liquid additives, and the ionic conductivity of the obtained electrolyte at room temperature may reach $3.6 \times 10^{-4}$ S/cm, while it also exhibits a high sodium ion migration number and a wide electrochemical window, which may reach 4.7V. In addition, in order to construct a stable electrode/electrolyte interface and reduce the interface impedance, the present disclosure also modifies the positive and negative electrodes of the sodium ion battery to prepare composite positive and negative electrodes, and the final assembled all-solid-state sodium ion battery exhibits excellent rate performance and cycle stability at room temperature, and its discharge specific capacity at room temperature may reach 104.8 mAh/g, and after 80 cycles, the capacity retention rate is 85.4%.

DETAILED DESCRIPTION OF THE PREFERRED EMBODIMENT

Embodiment 1

1. Preparation of a Boron-Containing Ternary Crosslinker (B-Crosslinker)

2.6 mL of trimethyl borate and 8.5 mL of hydroxyethyl methacrylate were measured and dissolved in 25 mL of anhydrous acetonitrile, and the mixed solution was stirred and reacted for 3 to 4 hours at 50° C. under the protection of inert atmosphere. Then, the temperature was raised to 70° C., and the stirring was continued for 3 to 5 hours to remove the methanol produced in the reaction to ensure the complete reaction. After the reaction was completed, the unreacted trimethyl borate and residual solvent were removed by distillation under reduced pressure, and dried under vacuum for 48 hours. The obtained light yellow liquid product (i.e., B-crosslinker) was sealed and stored in a glove box for future use to prevent hydrolysis (for the specific preparation method, see literature: *ACS Appl. Mater. Interfaces* 2016, 8, 27740-27752).

The boron-containing ternary crosslinker (B-crosslinker) used in the following embodiments and comparative embodiments were prepared according to this preparation method.

2. Preparation of an all-Solid-State Plastic Crystal Polymer Electrolyte Film

A certain amount of sodium perchlorate ($NaClO_4$) was weighed and added to succinonitrile (SN), and the mixture was heated and stirred to form a transparent and uniform $NaClO_4$ salt solution 1 of succinonitrile, in which a concentration of $NaClO_4$ in SN was 1 mol/L. Then a certain amount of the B-crosslinker (n=1) was added to the solution 1, and a certain mass fraction of 1173 photoinitiator was added to the system at the same time, and the stirring was continued to make a homogeneous solution 2. In the solution 2, a mass fraction of the added B-crosslinker (n=1) was 12 wt. %, and a content of the photoinitiator 1173 was 1 wt. % of the mass of the active monomer B-crosslinker (n=1). Then, the mixed solution was injected to the polypropylene-cellulose composite nonwoven fabric, and after the solution was completely immersed. The nonwoven fabric containing the mixed solution was sandwiched between two clean glass sheets, and was cured into a film by ultraviolet curing technology, so that the final all-solid-state plastic crystal polymer electrolyte was obtained.

The ionic conductivity of the all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma = d/SR_b$, where, d is the thickness of the electrolyte, S is the area of the stainless steel sheet at room temperature, and $R_b$ is the measured bulk impedance. The all-solid-state polymer electrolyte was tested to have an ionic conductivity of $3.6 \times 10^{-4}$ S/cm at 25° C.

The electrochemical window of the all-solid-state plastic crystal polymer electrolyte was tested: the stainless steel sheet and a sodium sheet were used as working electrode and reference electrode respectively, and the electrolyte was sandwiched between them and placed in 2032 battery case. The electrochemical window of the electrolyte was measured by linear sweep voltammetry using an electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 4.7 V. The sodium ion migration number of the all-solid-state plastic crystal polymer electrolyte was tested: The electrolyte film was sandwiched between two sodium sheets, and the sodium ion migration number was measured by electrochemical AC impedance combined with DC polarization. The sodium ion migration number of the electrolyte was calculated by the formula $$t_{Na^+} = \frac{I_s R_f (\Delta V - I_0 R_I^0)}{I_0 R_i (\Delta V - J_s R_I^s)}.$$

Among them, $\Delta V$ is the DC voltage applied to both sides of the electrode, $I_0$ and $I_s$ are the initial and stabilized current values respectively, $R_i$ and $R_f$ are the initial and polarized impedances of the electrolyte film, $R_I^0$ and $R_I^s$ are the initial and polarized interface impedances of the electrode e/electrolyte respectively. The solid-state polymer electrolyte was tested to have a sodium ion migration number of 0.62 at 25° C.

3. In-situ preparation of a sodium ion battery composite electrode

Preparation of a composite positive/negative electrode: polyvinylidene fluoride (PVdF) was dissolved in N,N-2-methylpyrrolidone at a concentration of 0.1 mol/L. Then the positive electrode active material layered oxide $Na_{1/3}Fe_{1/3}Mn_{1/3}O_2$/ negative electrode active material hard carbon, binder PVdF, and conductive agent Super P were mixed in a mass ratio of 8:1:1 and ground for at least 1 hour. The slurry obtained from the previous steps was evenly coated on the aluminum foil, vacuum dried and then cut according to the size. Next, the cut electrode sheet was immersed in the above mixture solution 2 to allow the reaction precursor solution to enter the inside of the electrode, and finally the electrode sheet was taken out and placed under an ultraviolet lamp for ultraviolet curing to obtain the final composite positive/negative electrode.

Figure 1:
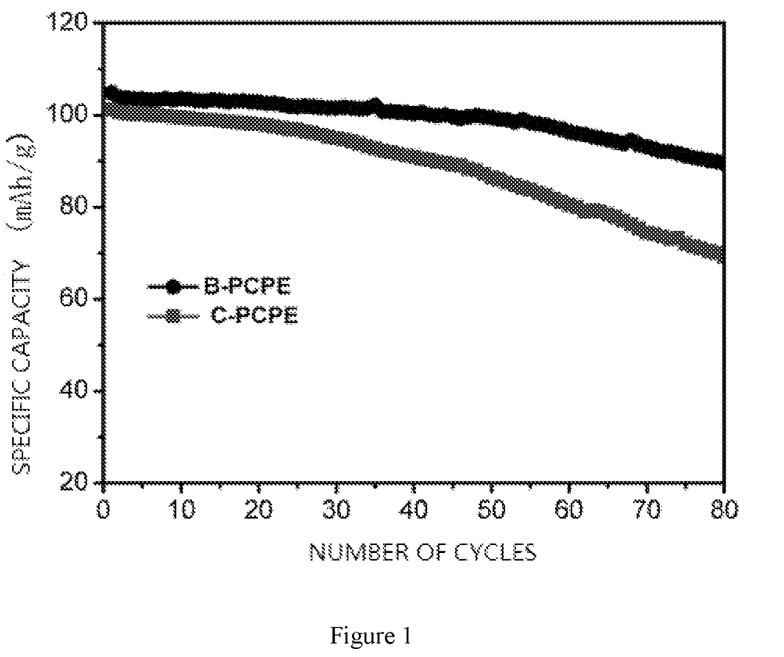
FIG. 1 shows the cycle stability of the all-solid-state battery at room temperature assembled with boron-containing and boron-free plastic crystal electrolytes as described in embodiment 1 and comparative embodiment 1, respectively.
Figure 2:
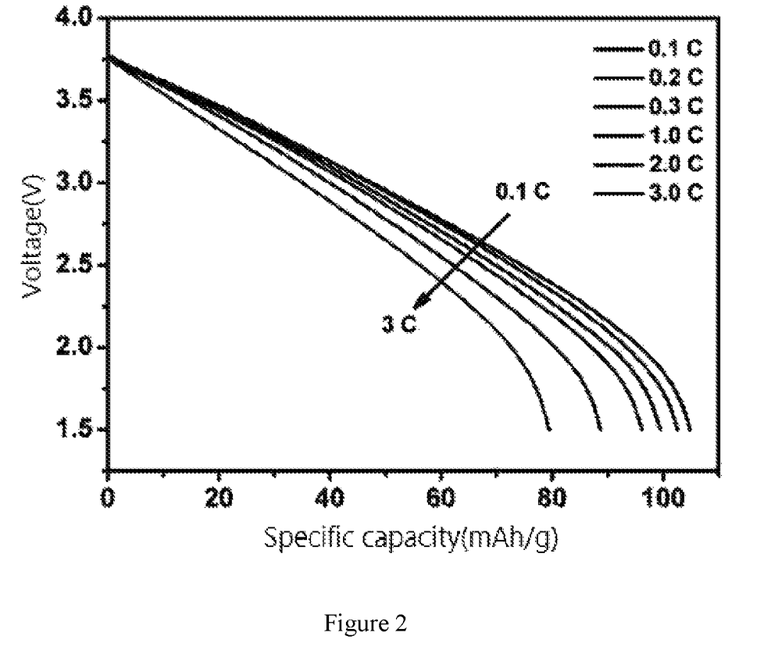
FIG. 2 shows the discharge curves of the all-solid-state sodium ion battery described in embodiment 1 at different current densities.
Figure 3:
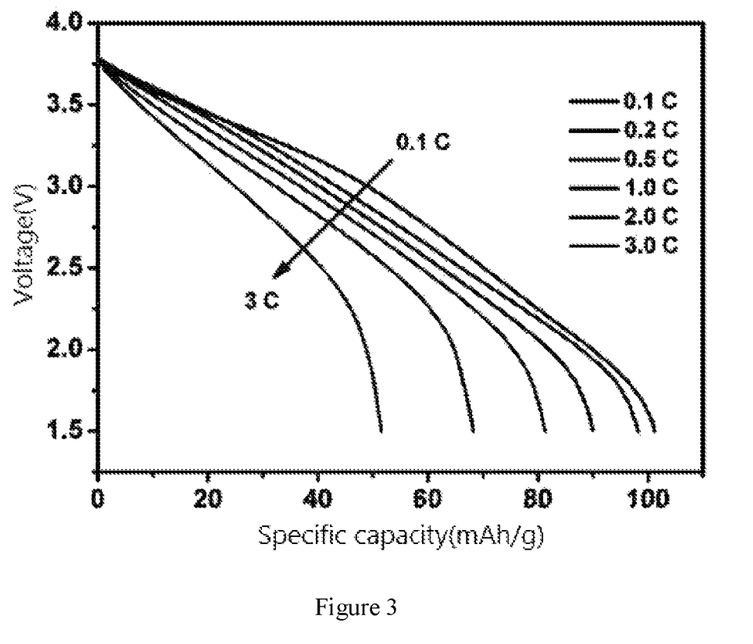
FIG. 3 shows the discharge curves of the all-solid-state sodium ion battery described in comparative embodiment 1 at different current densities.

The composite $Na_{1/3}Fe_{1/3}Mn_{1/3}O_2$ electrode prepared above was used as the positive electrode and the composite hard carbon was used as the negative electrode, the plastic crystal polymer electrolyte was assembled into the all-solid-state sodium battery, and this embodiment was measured with a LAND battery charging and discharging instrument, as shown in FIG. 2 and FIG. 3. The discharge specific capacity of the all-solid-state sodium battery assembled with this plastic crystal polymer electrolyte was tested to be 104.8 mAh/g at room temperature, and after 80 cycles, the capacity retention rate was 85.4% (FIG. 1); and the all-solid-state sodium ion battery assembled with this solid-state polymer electrolyte had good rate performance, with a discharge capacity of 80.24 mAh/g at current density of 0.5 A/g.

Embodiment 2

1. Preparation of an all-Solid-State Plastic Crystal Polymer Electrolyte Film

A certain amount of sodium trifluoromethanesulfonate (NaOTf) was weighed and added to succinonitrile (SN), and the mixture was heated and stirred to form a transparent and uniform NaOTf salt solution 1 of succinonitrile, in which the concentration of NaOTf in SN was 1.25 mol/L. Then a certain amount of the B-crosslinker (n=6) was added to the solution 1, and a certain mass fraction of 184 photoinitiator was added to the system at the same time, and stirring was continued to make a homogeneous solution 2. In the solution 2, the mass fraction of B-crosslinker (n=6) was 30 wt. %, and the content of photoinitiator 184 was 5 wt. % of the mass of active monomer B-crosslinker (n=6). Then, the mixed solution was injected to the polyacrylonitrile nonwoven fabric, and after the solution was completely immersed. The nonwoven fabric containing the mixed solution was sandwiched between two clean glass sheets, and was cured into a film by ultraviolet curing technology, so that the final all-solid-state plastic crystal polymer electrolyte was obtained.

The ionic conductivity of the all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma = d/SR_b$, where, d is the thickness of the electrolyte, S is the area of the stainless steel sheet at room temperature, and $R_b$ is the measured bulk impedance. The solid polymer electrolyte was tested to have an ionic conductivity of $9.2 \times 10^{-5}$ S/cm at 25° C.

The electrochemical window of the all-solid-state plastic crystal polymer electrolyte was tested: a stainless steel sheet and a sodium sheet were used as working electrode and reference electrode respectively, and the electrolyte was sandwiched between them and placed in 2032 battery case. The electrochemical window of electrolyte was measured by linear sweep voltammetry in the electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 4.8 V.

The sodium ion migration number of the all-solid-state plastic crystal polymer electrolyte was tested:

The electrolyte film was sandwiched between two sodium sheets, and the sodium ion migration number was measured by electrochemical AC impedance combined with DC polarization. The sodium ion migration number of the electrolyte was calculated by the formula $$t_{Na^+} = \frac{I_s R_f (\Delta V - I_0 R_i^0)}{I_0 R_i (\Delta V - J_s R_f^s)}.$$

Among them, $\Delta V$ is the DC voltage applied to both sides of the electrode, $I_0$ and $I_s$ are the initial and stabilized current values, respectively, $R_i$ and $R_f$ are the initial and polarized impedances of the electrolyte film, and $R_f^0$ and $R_f^s$ are the initial and polarized interface impedances of the electrode/electrolyte respectively. The solid-state polymer electrolyte was tested to have a sodium ion migration number of 0.67 at 25° C.

2. In-Situ Preparation of the Sodium Ion Battery Composite Electrode

Preparation of the composite positive/negative electrode: sodium carboxymethyl cellulose was dissolved in N,N-2-methylpyrrolidone at a concentration of 0.1 mol/L. Then, the positive electrode active material sodium vanadium phosphate [$Na_3V_2(PO_4)_3$]/ negative electrode active material molybdenum disulfide ($MoS_2$), binder sodium carboxymethyl cellulose and conductive agent acetylene black were mixed in a mass ratio of 7:2:1 and ground for at least 1 hour. The slurry obtained from the previous steps was evenly coated on the aluminum foil, vacuum dried and then cut according to the size. Next, the cut electrode sheet was immersed in the above mixture solution 2 to allow the reaction precursor solution to enter the inside of the electrode, and finally the electrode sheet was taken out and placed under an ultraviolet lamp for ultraviolet curing to obtain the final composite positive/negative electrode.

The composite $Na_3V_2(PO_4)_3$ electrode prepared above was used as the positive electrode and the composite $MoS_2$ was used as the negative electrode, the plastic crystal polymer electrolyte was assembled into the all-solid-state sodium battery, and this embodiment was measured with the LAND battery charging and discharging instrument. The all-solid-state sodium battery assembled with this plastic crystal polymer electrolyte was tested to have a current density of 0.2 A/g and a discharge specific capacity of 84 mAh/g at room temperature.

Embodiment 3

1. Preparation of an all-Solid-State Plastic Crystal Polymer Electrolyte Film

A certain amount of sodium bis(trifluoromethylsulfonylimine) (NaTFSI) was weighed and added to succinonitrile (SN), and the mixture was heated and stirred to form a transparent and uniform NaTFSI salt solution 1 of succinonitrile, in which the concentration of NaTFSI in SN was 0.25 mol/L. Then a certain amount of B-crosslinker (n=20) was added to the solution 1, and a certain mass fraction of 1173 photoinitiator was added to the system at the same time, and stirring was continued to make a homogeneous solution 2. In the solution 2, the mass fraction of B-crosslinker (n=20) was 8 wt. %, and the content of photoinitiator 1173 was 0.5 wt. % of the mass of active monomer B-crosslinker (n=20). Then, the mixed solution was injected to the cellulose film support material, and after the solution was completely immersed, the nonwoven fabric containing the mixed solution was sandwiched between two clean glass sheets, and was cured into a film by ultraviolet curing technology, so that the final all-solid-state plastic crystal polymer electrolyte was obtained.

The ionic conductivity of the all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma = d/SR_b$, where, d is the thickness of the electrolyte, S is the area of the stainless steel sheet at room temperature, and $R_b$ is the measured bulk impedance. The solid polymer electrolyte was tested to have an ionic conductivity of $1.32 \times 10^{-4}$ S/cm at 25° C.

The electrochemical window of the all-solid-state plastic crystal polymer electrolyte was tested: the stainless steel sheet and the sodium sheet were used as working electrode and reference electrode respectively, and the electrolyte was sandwiched between them and placed in 2032 battery case. The electrochemical window of electrolyte was measured by linear sweep voltammetry in the electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 4.3 V.

The sodium ion migration number of the all-solid-state plastic crystal polymer electrolyte was tested:

The electrolyte film was sandwiched between two sodium sheets, and the sodium ion migration number was measured by electrochemical AC impedance combined with DC polarization. The sodium ion migration number of the electrolyte was calculated by the formula $$t_{Na^+} = \frac{I_s R_f (\Delta V - I_0 R_f^0)}{I_0 R_i (\Delta V - J_s R_f^s)}.$$

Among them, $\Delta V$ is the DC voltage applied to both sides of the electrode, $I_0$ and $I_s$ are the initial and stabilized current values, respectively, $R_i$ and $R_f$ are the initial and polarized impedances of the electrolyte film, $R_f^0$ and $R_f^s$ are the initial and polarized interface impedances of the electrode e/electrolyte, respectively. The all-solid-state polymer electrolyte was tested to have a sodium ion migration number of 0.40 at 25° C.

2. In-Situ Preparation of the Sodium Ion Battery Composite Electrode

Preparation of the composite positive electrode: the binder sodium alginate was dissolved in N,N-2-methylpyrrolidone at a concentration of 0.1 mol/L. Then, the positive electrode active material Prussian blue, binder sodium alginate and conductive agent Ketjen carbon were mixed in a mass ratio of 6:2:2 and ground for at least 1 hour. The slurry obtained from the previous steps was evenly coated on the aluminum foil, vacuum dried and then cut according to the size. Next, the cut electrode sheet was immersed in the above mixture solution 2 to allow the reaction precursor solution to enter the inside of the electrode, and finally the electrode sheet was taken out and placed under an ultraviolet lamp for ultraviolet curing to obtain the final composite positive electrode. In this embodiment, the negative electrode adopted a metal sodium sheet.

The composite Prussian blue electrode prepared above was used as the positive electrode and the sodium metal was used as the negative electrode, the plastic crystal polymer electrolyte was assembled into an all-solid-state sodium battery, and this embodiment was measured with a LAND battery charging and discharging instrument. The all-solid-state sodium battery assembled with this plastic crystal polymer electrolyte was tested to have a discharge specific capacity of 92.0 mAh/g at room temperature.

Comparative Embodiment 1

1. Preparation of a Boron-Free all-Solid-State Plastic Crystal Polymer Electrolyte Film A certain amount of sodium perchlorate ($NaClO_4$) was weighed and added to succinonitrile (SN), and the mixture was heated and stirred to form a transparent and uniform $NaClO_4$ salt solution 1 of succinonitrile, in which the concentration of $NaClO_4$ in SN was 1 mol/L. Then a certain amount of ETPTA crosslinker was added to the solution 1, and a certain mass fraction of 1173 photoinitiator was added to the system at the same time, and stirring was continued to make a homogeneous solution 2. In the solution 2, a mass fraction of ETPTA was 12 wt. %, and a content of photoinitiator 1173 was 1 wt. % of the mass of active monomer ETPTA. Then, the mixed solution was injected to the polypropylene-cellulose composite nonwoven fabric, and after the solution was completely immersed, the nonwoven fabric containing the mixed solution was sandwiched between two clean glass sheets, and was cured into a film by ultraviolet curing technology, so that the final boron-free all-solid-state plastic crystal polymer electrolyte was obtained, marked as C-PCPE.

The ionic conductivity of the boron-free all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma = d/SR_b$, where, d is the thickness of the electrolyte, S is the area of the stainless steel sheet at room temperature, and $R_b$ is the measured bulk impedance. The solid-state polymer electrolyte was tested to have an ionic conductivity of $4.0 \times 10^{-4}$ S/cm at 25° C.

The electrochemical window of the boron-free all-solid-state plastic crystal polymer electrolyte was tested: a stainless steel sheet and a sodium sheet were used as working electrode and reference electrode respectively, and the electrolyte was sandwiched between them and placed in 2032 battery case. The electrochemical window of electrolyte was measured by linear sweep voltammetry in an electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 4.5 V.

The sodium ion migration number of the boron-free all-solid-state plastic crystal polymer electrolyte was tested:

The electrolyte film was sandwiched between two sodium sheets, and the sodium ion migration number was measured by electrochemical AC impedance combined with DC polarization. The sodium ion migration number of the electrolyte was calculated by the formula $$t_{Na^+} = \frac{I_s R_f (\Delta V - I_0 R_f^0)}{I_0 R_i (\Delta V - J_s R_f^s)}.$$

Among them, $\Delta V$ is the DC voltage applied to both sides of the electrode, $I_0$ and $I_s$ are the initial and stabilized current values, respectively, $R_i$ and $R_f$ are the initial and polarized impedances of the electrolyte film, $R_f^0$ and $R_f^s$ are the initial and polarized interface impedances of the electrode e/electrolyte, respectively. The all-solid-state polymer electrolyte was tested to have a sodium ion migration number of 0.26 at 25° C.

2. In-Situ Preparation of a Sodium Ion Battery Composite Electrode

Preparation of a composite positive/negative electrode: polyvinylidene fluoride (PVdF) was dissolved in N,N-2-methylpyrrolidone at a concentration of 0.1 mol/L. Then the positive electrode active material layered oxide $Na_{1/3}Fe_{1/}$ ₃Mn₁/₃O₂/ negative electrode active material hard carbon, binder PVdF, and conductive agent Super P were mixed in a mass ratio of 8:1:1 and ground for at least 2 hours. The slurry obtained from the previous step was evenly coated on the aluminum foil, vacuum dried and then cut according to the size. Next, the cut electrode sheet was immersed in the above mixture solution 2 to allow the reaction precursor solution to enter the inside of the electrode, and finally the electrode sheet was taken out and placed under an ultraviolet lamp for ultraviolet curing to obtain the final composite positive/composite negative electrode.

The composite $Na_{1/3}Fe_{1/3}Mn_{1/3}O_2$/ electrode prepared above was used as the positive electrode and the composite hard carbon was used as the negative electrode, boron-free plastic crystal polymer electrolyte was assembled into the all-solid-state sodium battery, and this embodiment was measured with a LAND battery charging and discharging instrument. The discharge specific capacity of the all-solid-state sodium battery assembled with this plastic crystal polymer electrolyte was tested to be 101.2 mAh/g at room temperature, but as the number of cycles increased, the capacity decreased significantly, and after 80 cycles, the capacity retention rate was less than 65% (FIG. 1); and the all-solid-state sodium ion battery assembled with this boron-free plastic crystal all-solid-state polymer electrolyte had poor rate performance, with a low discharge capacity of 48.1 mAh/g at current density of 0.5 A/g (FIG. 3).

Comparative Embodiment 2

Preparation of an all-Solid-State Plastic Crystal Polymer Electrolyte Film

A certain amount of $NaClO_4$ was weighed and added to succinonitrile (SN), and the mixture was heated and stirred to form a transparent and uniform $NaClO_4$ salt solution 1 of succinonitrile, in which the concentration of $NaClO_4$ in SN was 2 mol/L. Then a certain amount of B-HEMA crosslinker was added to the solution 1, and a certain mass fraction of 1173 photoinitiator was added to the system at the same time, and stirring was continued to make a homogeneous solution 2. In the solution 2, a mass fraction of B-HEMA was 35 wt. %, and a content of photoinitiator 1173 was 0.5 wt. % of the mass of active monomer B-HEMA. Then, the mixed solution was injected to the cellulose support material, and after the solution was completely immersed, the nonwoven fabric containing the mixed solution was sandwiched between two clean glass sheets, and was cured into a film by ultraviolet curing technology, so that the final all-solid-state plastic crystal polymer electrolyte was obtained.

The ionic conductivity of the all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma = d/SR_b$, where, d is the thickness of the electrolyte, S is the area of the stainless steel sheet at room temperature, and $R_b$ is the measured bulk impedance. The all-solid-state polymer electrolyte was tested to have a very low ionic conductivity of 9.4×10 S/cm at 25° C.

The electrochemical window of the all-solid-state plastic crystal polymer electrolyte was tested: a stainless steel sheet and a sodium sheet were used as working electrode and reference electrode respectively, and the electrolyte was sandwiched between them and placed in 2032 battery case. The electrochemical window of electrolyte was measured by linear sweep voltammetry in an electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 4.4 V.

The sodium ion migration number of the all-solid-state plastic crystal polymer electrolyte was tested.

The electrolyte film was sandwiched between two sodium sheets, and the sodium ion migration number was measured by electrochemical AC impedance combined with DC polarization. The sodium ion migration number of the electrolyte was calculated by the formula $$t_{Na^+} = \frac{I_s R_f (\Delta V - I_0 R_I^0)}{I_0 R_i (\Delta V - J_s R_I^s)}.$$

Among them, $\Delta V$ is the DC voltage applied to both sides of the electrode, $I_0$ and $I_s$ are the initial and stabilized current values, respectively, $R_i$ and $R_f$ are the initial and polarized impedances of the electrolyte film, $R_I^0$ and $R_I^s$ are the initial and polarized interface impedances of the electrode e/electrolyte, respectively. The all-solid-state polymer electrolyte was tested to have a sodium ion migration number of 0.69 at 25° C.

Due to the low ionic conductivity of the plastic crystal polymer electrolyte prepared in this comparative embodiment at room temperature, the assembled all-solid-state battery cannot be charged and discharged at room temperature, no later experiments were performed.

Comparative Embodiment 3

Preparation of an all-Solid-State Plastic Crystal Polymer Electrolyte Film

A certain amount of NaTf was weighed and added to succinonitrile (SN), and the mixture was heated and stirred to form a transparent and uniform NaTf salt solution 1 of succinonitrile, in which the concentration of NaTf in SN was 0.2 mol/L. Then a certain amount of B-crosslinker (n=6) was added to the solution 1, and a certain mass fraction of 1173 photoinitiator was added to the system at the same time, and stirring was continued to make a homogeneous solution 2. In the solution 2, a mass fraction of B-crosslinker (n=6) was 5 wt. %, and a content of photoinitiator 1173 was 1 wt. % of the mass of active monomer B-crosslinker (n=6). Then, the mixed solution was injected to the cellulose support material, and after the solution was completely immersed, the nonwoven fabric containing the mixed solution was sandwiched between two clean glass sheets, and was cured into a film by ultraviolet curing technology, so that the final all-solid-state plastic crystal polymer electrolyte was obtained.

The ionic conductivity of the all-solid-state plastic crystal polymer electrolyte was tested:

The electrolyte film was sandwiched between two stainless steel sheets and placed in a 2032 battery case, and then the ionic conductivity of the electrolyte was measured by electrochemical AC impedance spectroscopy, and the ionic conductivity was calculated by the formula: $\sigma=d/SR_b$, where, d is the thickness of the electrolyte, S is the area of the stainless steel sheet at room temperature, and $R_b$ is the measured bulk impedance. The all-solid-state polymer electrolyte was tested to have a very low ionic conductivity of $1.2\times10^{-5}$ S/cm at 25° C. The electrochemical window of the all-solid-state plastic crystal polymer electrolyte was tested: a stainless steel sheet and a sodium sheet were used as working electrode and reference electrode respectively, and the electrolyte was sandwiched between them and placed in 2032 battery case. The electrochemical window of electrolyte was measured by linear sweep voltammetry in an electrochemical workstation, the test temperature was 25° C., the starting potential was 2.0V, the highest potential was 6.0V, and the scanning speed was 0.5 mV/s. The electrochemical window of the all-solid-state plastic crystal polymer electrolyte was tested to be 3.8 V.

The sodium ion migration number of the all-solid-state plastic crystal polymer electrolyte was tested.

The electrolyte film was sandwiched between two sodium sheets, and the sodium ion migration number was measured by electrochemical AC impedance combined with DC polarization. The sodium ion migration number of the electrolyte was calculated by the formula

$$t_{Na^+} = \frac{I_s R_f (\Delta V - I_0 R_I^0)}{I_0 R_i (\Delta V - J_s R_I^s)}.$$

Among them, $\Delta V$ is the DC voltage applied to both sides of the electrode, $I_0$ and $I_s$ are the initial and stabilized current values, respectively, $R_i$ and $R_f$ are the initial and polarized impedances of the electrolyte film, $R_I^0$ and $R_I^s$ are the initial and polarized interface impedances of the electrode e/electrolyte, respectively. The all-solid-state polymer electrolyte was tested to have a sodium ion migration number of 0.29 at 25° C.

Due to the low ionic conductivity of the plastic crystal polymer electrolyte prepared in this comparative embodiment at room temperature, the narrow electrochemical window, the assembled all-solid-state battery cannot be charged and discharged at room temperature, no later experiments were performed.

What is claimed is:

1. A method for preparing an all-solid-state ion battery, comprising the following steps:
   (1) immersing an electrode sheet in a mixture until the mixed solution is fully immersed into the inside of the electrode sheet, curing to obtain a composite positive and negative electrode sheet prepared in situ;
   the mixture containing a plastic crystal, a metal salt, a monomer and a photoinitiator;
   (2) sandwiching a boron-containing plastic crystal polymer between the composite positive and the negative electrode sheet, and assembling;
   the boron-containing plastic crystal polymer is prepared by the method comprising the following steps:
   curing the mixture;
   the monomer is a boron-containing ternary crosslinker, the structure of which is shown below:

wherein, the value of n is 1 to 20; the plastic crystal is succinonitrile.

2. The method according to claim 1, wherein, the electrode sheet is prepared by the following steps:
   (1) adding a positive/negative electrode active material for ion batteries, a conductive agent and a binder to N-methylpyrrolidone solvent and homogenizing to obtain a slurry;
   (2) evenly coating the slurry on aluminum foil, and drying in vacuum.

3. The method according to claim 2, wherein, in step (1), a mass ratio of the positive/negative electrode active material for the ion batteries to the conductive agent is (3 to 16):1, a mass ratio of the binder to the conductive agent is (0.25 to 4):1, and the homogenization time is 2 to 4 hours;
   or, the positive electrode active material is layered oxide, sodium vanadium phosphate, sodium iron sulfate, sodium ion fluorophosphate, Prussian blue, Prussian white, sodium vanadium fluorophosphate, sodium iron fluorophosphate, sodium manganese oxide or sodium cobalt oxide;
   or, the negative electrode active material is sodium metal, hard carbon or molybdenum disulfide;
   or, the conductive agent is Super P, acetylene black or Ketjen black;
   or, the binder is one or more of PVDF, sodium carboxymethyl cellulose and sodium alginate.

4. The method according to claim 3, wherein, in step (1), the mass ratio of the positive/negative electrode active material for the ion batteries to the conductive agent is 8:1, and the mass ratio of the binder to the conductive agent is 1:1.

5. The method according to claim 1, wherein, the plastic crystal is mixed with the metal salt to obtain a mixed solution and then mixed with the monomer and the photoinitiator to obtain the mixture.

6. The method according to claim 5, wherein, the method for preparing the mixture comprises the following steps:
   (1) mixing the metal salt with the plastic crystal, heating and stirring to obtain a mixed solution;
   (2) mixing the mixed solution obtained in step (1) with the boron-containing ternary crosslinker and the photoinitiator to obtain the mixture.

7. The method according to claim 1, wherein, the metal salt is sodium salt, lithium salt or aluminum salt;
   or, the photoinitiator is 2-hydroxy-2-methyl-1-phenylacetone or 1-hydroxycyclohexyl phenyl ketone;
   or, the curing is ultraviolet curing;
   or, the mixture is added to a porous support material before the curing;
   or, the mixture is present in liquid form.

8. The method according to claim 7, wherein, when the mixture is added to the porous support material, a porous support material containing the mixture is sandwiched between two glass sheets before subsequent curing.

9. The method according to claim 5, wherein, a concentration of the metal salt in the mixed solution is 0.25 to 1.25 mol/L.

10. The method according to claim 9, wherein, the concentration of the metal salt in the mixed solution is 1 mol/L.

11. The method according to claim 1, wherein, in the mixture, a concentration of the boron-containing ternary crosslinker is 8 to 30 wt. %;
   or, an amount of the photoinitiator is 0.5 to 5 wt. % of the boron-containing ternary crosslinker;
   or, the value of n is 1, 6 or 20.

12. The method according to claim 11, wherein, in the mixture, the concentration of the boron-containing ternary crosslinker is 10 wt. %;
   or, the amount of the photoinitiator is 1 wt. % of the boron-containing ternary crosslinker.

13. The method according to claim 7, wherein, the sodium salt is one or more of sodium perchlorate, sodium hexafluorophosphate, sodium bis (oxalate) borate and sodium trifluoromethanesulfonate;
   or, the addition is injection;
   or, the porous support material is one or a composite film of polyacrylonitrile nonwoven fabric, polypropylene hydrocarbon nonwoven fabric, cellulose film, glass fiber, polyethylene terephthalate film and polyimide nonwoven film.

14. The method according to claim 13, wherein, the porous support material is polyacrylonitrile nonwoven fabric, polypropylene-cellulose composite nonwoven fabric or cellulose film.

* * * * *